United States Patent [19]

Link

[11] 4,334,743
[45] Jun. 15, 1982

[54] OPTICAL ARRANGEMENT FOR USE IN A MICROFICHE READER AND METHOD

[75] Inventor: William T. Link, Berkeley, Calif.

[73] Assignee: Datagraphix, Inc., San Diego, Calif.

[21] Appl. No.: 127,228

[22] Filed: Mar. 4, 1980

[51] Int. Cl.³ .............................................. G03B 21/14
[52] U.S. Cl. ...................................... 353/97; 353/121
[58] Field of Search .................... 353/121, 122, 25–27, 353/85, 97, 102, 84; 350/434, 440

[56] References Cited

U.S. PATENT DOCUMENTS

| 1,395,338 | 11/1921 | Gage | 353/102 X |
| 2,817,997 | 12/1957 | Ulffers | 353/81 |
| 3,413,061 | 11/1968 | Simpson et al. | 353/27 R X |

FOREIGN PATENT DOCUMENTS

| 514477 | 11/1939 | United Kingdom | 353/29 |
| 884310 | 4/1943 | France | 353/97 |

Primary Examiner—Harry N. Haroian
Attorney, Agent, or Firm—Flehr, Hohbach, Test, Albritton & Herbert

[57] ABSTRACT

A microfiche reader is disclosed herein and includes an optical arrangement for providing an image of a supported microfiche on a projection screen. This optical arrangement utilizes a beam of light which is directed from a light source along a path through the microfiche and towards the back side of the screen. A condenser lens is located on this beam path between the microfiche and light source and includes a focal point also located on the path but on the other side of the microfiche. A projection lens assembly is located between the microfiche and the focal point of the condenser lens, again on the beam path, such that there is a predetermined spacing between the projection lens assembly and focal point. This spacing is selected to increase and preferably maximize illumination efficiency of the overall optical arrangement.

8 Claims, 8 Drawing Figures

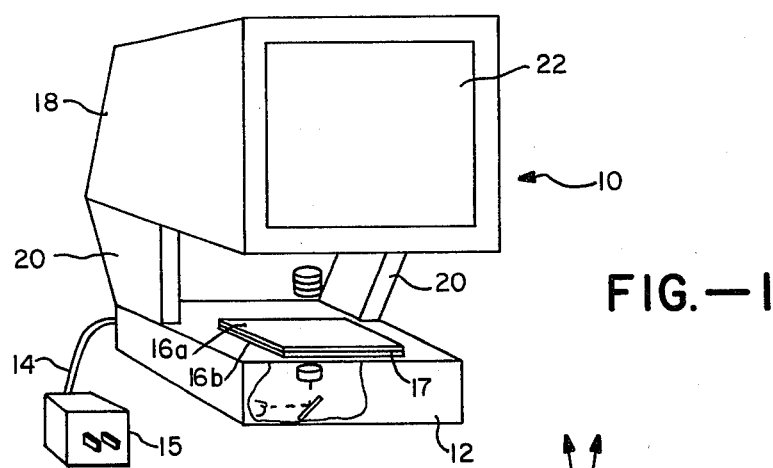
FIG.—1
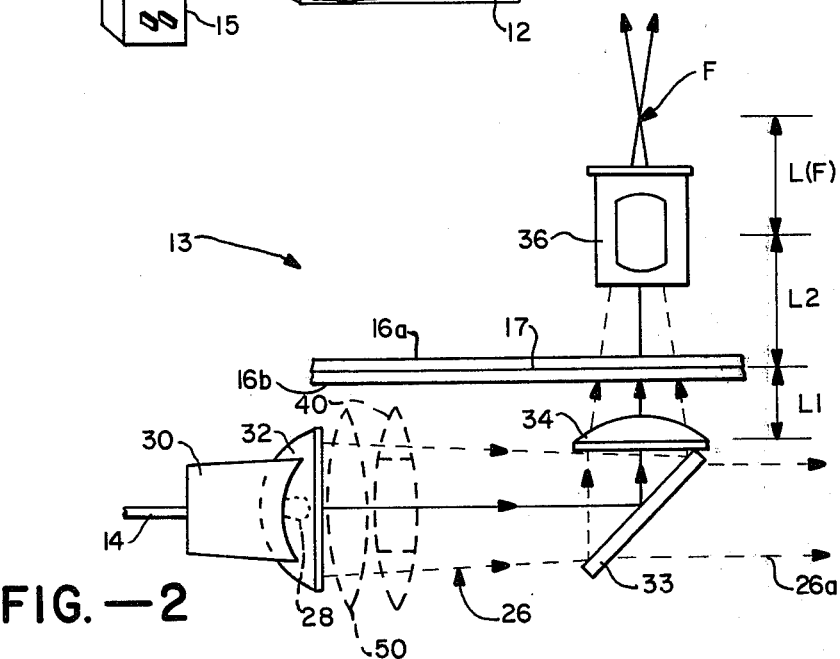
FIG.—2
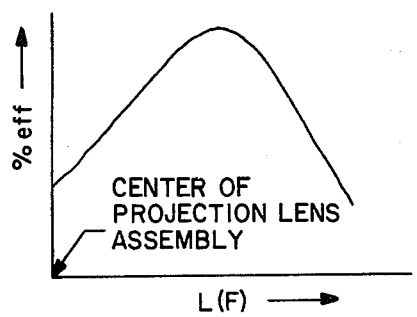
FIG.—3

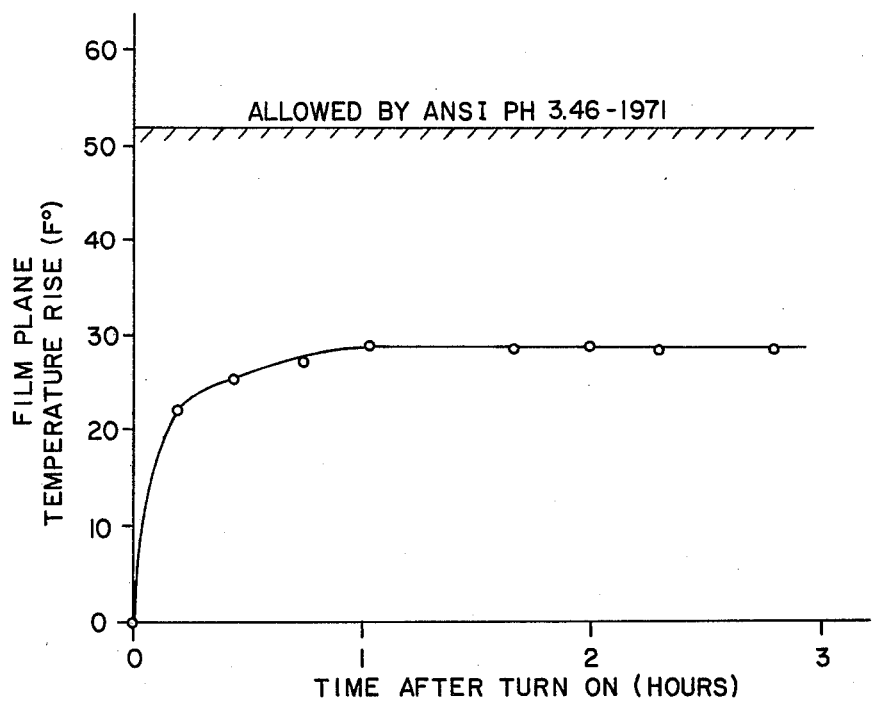
FIG.—4
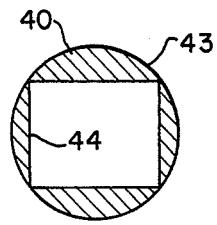
FIG.—5
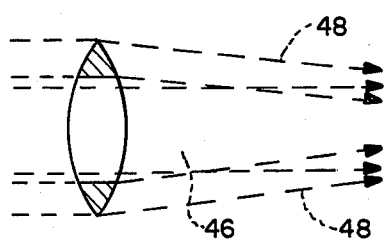
FIG.—6
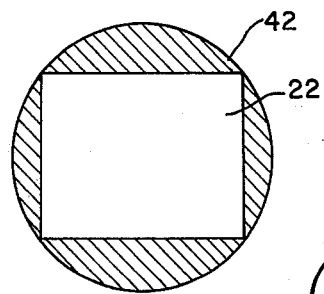
FIG.—7
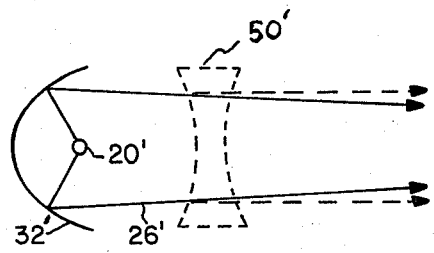
FIG.—8

OPTICAL ARRANGEMENT FOR USE IN A MICROFICHE READER AND METHOD

The present invention relates generally to a microfiche reader and its method of operation and more particularly to a microfiche reader assembly utilizing a unique optical arrangement and method with improved illumination efficiency.

A typical microfiche reader assembly of the general type to which the present invention is directed is one which includes a housing having an inner chamber, a projection screen supported by the housing and a carriage or other such means for supporting the microfiche to be viewed. This assembly, which is of the rear projection type (but which may also be of the front projection type), also includes an optical arrangement for directing a beam of light through the microfiche and housing and onto the back side of the screen for projecting an illuminated image of the microfiche thereon. In order to accomplish this, the optical arrangement utilizes a number of components including a light source, a condenser lens, a projection lens assembly comprised of one or more lenses and possibly one or more mirrors or similar light reflecting surfaces.

In order to provide satisfactory illumination, contrast and general viewing of the microfiche image across the projection screen, the optical arrangement utilized should be one which is capable of delivering between about 25 and 100 ft. L (foot Lambert) from the screen. If the light level from the screen is below this range, the brightness may not be sufficient for adequate viewing. On the other hand, if the screen provides more than 100 ft. L, this relatively high brightness level might result in discomfort to the viewer and, in any event, it would be an unnecessary use of power. In order to provide the appropriate illumination level at the screen, it is necessary to provide a substantially higher output at the light source. This is because much of the light is lost at the various components which are located therebetween and which operate on the light beam in one way or another. Examples of these components include the previously recited condenser lens, projector lens assembly and mirrors (when used) as well as other components not previously mentioned such as an infrared filter, various apertures and the microfiche itself along with its means of support. In one microfiche reader presently available in the prior art, a 130 watt lamp having a light output of approximately 3,560 lumens is used in ultimately delivering 5.1 lumens from onto its screen. This results in a gross efficiency (lumens output/lumens input×100) of 0.14%. In another microfiche reader presently available in the prior art, a 48 watt lamp having a light output of 705 lumens is utilized to deliver 7.7 lumens from its screen which is a gross efficiency of 0.7%.

In both of the prior art readers just recited, an internal cooling fan is utilized along with an internal transformer, that is, a transformer provided within its housing. Both are necessary because of the relatively high light power required to provide the minimum necessary lumens to their respective screens. More specifically, without the utilization of the fan, these relatively high powered lamps result in a temperature rise at their respective film or microfiche planes above the level allowed by the ANSI, Code Section PH 3.46-1971. Moreover, the operating powers of 130 watts and 48 watts are in each too large to permit the use of wall plug transformers approvable by the Underwriter's Laboratories (UL). In addition, both readers were operated by battery using D cells and because of the relatively high power requirement in both cases, their respective discharge times were relatively low. In the case of the reader using the 130 watt lamp, its nine cells discharged completely within approximately 12 minutes of continued use. In the case of the reader using the 48 watt lamp, its nine cells discharged completely after approximately one hour and 15 minutes of use.

As will be seen hereinafter, the microfiche reader assembly disclosed herein utilizes an optical arrangement which is significantly more efficient from an illumination standpoint than the readers described above. As will also be seen, this is accomplished in an uncomplicated and economical way and to a degree sufficient to eliminate the necessity of a fan and an internal transformer and to improve substantially the useful life of its batteries when operated on the latter.

One object of the present invention is to provide a microfiche reader assembly of the general type described above but one having an optical arrangement which is more efficient from an illumination standpoint than those included in the previously discussed prior art readers.

A more specific object of the present invention is to provide a microfiche reader assembly having satisfactory illumination at its projection screen and yet one which utilizes a sufficiently low lamp output so that an internal fan is not required and so that a wall mounted transformer can be used in lieu of an internal transformer.

Another object of the present invention is to provide a microfiche reader assembly which can be battery operated in a more efficient manner than the readers described above.

Still another object of the present invention is to provide a microfiche reader assembly of the general type described above but one which includes an optical arrangement designed to insure that the maximum possible amount of the light from its beam is directed onto and within the confines of its screen.

A further object of the present invention is to provide a method of operating a microfiche reader assembly in a way which carries out the various objects just recited.

As will be seen hereinafter, the microfiche reader assembly disclosed herein is one which includes means for supporting a microfiche in a given area of a predetermined plane, a projection screen, and an optical arrangement for providing an image onto the screen. The optical arrangement is one which utilizes means including a light source for directing a beam of light along a predetermined path through a segment of the microfiche and towards the screen. It also includes a condenser lens located on the beam path between the light source and microfiche and a projection lens located between the microfiche and screen, also on the beam path.

In accordance with one aspect of the present invention, the optical arrangement just recited has been designed so that the focal point of the condenser lens is located on the beam path between the screen and the projection lens assembly a predetermined distance from the latter. This is to be contrasted with the position of the focal point of the condenser lens associated with each of the prior art microfiche readers discussed above. In each of these prior art readers, it was found that the focal point was at the projection lens assembly or in front of it, that is, between the latter and the microfiche. Applicant has found that by locating the focal point within a predetermined distance beyond the projection lens assembly, that is, between the latter and the screen, the overall lighting efficiency can be increased significantly. In a preferred embodiment, the distance between the projection lens assembly and the focal point is selected to maximize this efficiency.

In accordance with another aspect of the present invention, the optical arrangement described above includes means located on the beam path for insuring that the maximum possible amount of the light from the beam is directed onto and within the confines of the projector screen. In a preferred embodiment, a correction lens located on the beam path between the light source and condenser lens is utilized to this end. This correction lens includes a rectangular through hole for passing freely a central section of the beam sufficient to illuminate the confines of the screen and only the confines thereof. However, it also includes light refracting means around the periphery of the through hole for redirecting onto the screen substantially all of the light from the beam which would otherwise not fall within the confines of the screen. In this way, overall lighting efficiency is further improved.

FIG. 1 is a perspective view of a microfiche reader assembly constructed in accordance with the present invention.

FIG. 2 is a diagrammatic illustration of one part of an optical arrangement comprising part of the overall microfiche reader assembly illustrated in FIG. 1.

FIG. 3 diagrammatically illustrates lighting efficiency of the optical arrangement illustrated in FIG. 2 as a function of distance between the focal point of its condenser lens and its projection lens assembly.

FIG. 4 is a graphic illustration of temperature rise at the microfiche film utilized in the assembly of FIG. 1 as a function of time immediately after the assembly has been turned on.

FIG. 5 is a plan view of a correction lens comprising part of the optical arrangement in FIG. 2.

FIG. 6 is a side elevational view of the lens illustrated in FIG. 5.

FIG. 7 diagrammatically illustrates the projection screen comprising part of the assembly illustrated in FIG. 1 and partially shows how the screen could be illuminated.

FIG. 8 diagrammatically illustrates a modified beam producing arrangement for use in the optical arrangement of FIG. 2.

Turning now to the drawings, wherein like components are designated by like reference numerals throughout the various figures, a microfiche reader is illustrated in FIG. 1 and generally designated by the reference numeral 10. This microfiche reader utilizes a base 12 which serves to house a number of components including part of an optical arrangement 13 to be described below with respect to FIG. 2 as well as means including power cord 14 and an associated wall transformer 15 for powering this arrangement. The base also serves to support a pair of hinge mounted, light transparent glass plates 16A and 16B which, in turn, serve to contain a microfiche 17 therebetween. The top plate 16A is movable between a raised position so that the microfiche can be inserted over plate 16B and a lowered position against the bottom plate so that the microfiche can be held in place in a predetermined plane. In an actual embodiment, the two plates comprise part of an overall support carriage designed to move the two plates to any point within a given area in the predetermined plane. Reader 10 also includes a main housing 18 which, like base 12 serves to support parts of optical arrangement 13 within its own internal chamber. This housing which is held in place above the base by two support frames 20 also serves to support a projection screen 22 having a rear projection side facing into the housing chamber and a front viewing side.

As stated above, microfiche reader 10 includes optical arrangement, 13 a portion of which is illustrated in FIG. 2. This arrangement serves to provide an image onto the back side of screen 22 for viewing from its front side. In order to accomplish this, the arrangement includes a number of components which together direct a beam of light 26 along a predetermined path through a segment of the microfiche positioned between plates 16A and 16B and towards the back side of screen 22. These components include a light source 28 mounted within a receptacle 30 connected to previously recited cord 14 and a parabolic reflector 32 serving to form the beam and in a preferred embodiment to provide the beam with a circular cross section. These components also include a first mirror 33 for redirecting the light beam from its initial horizontal direction (see FIG. 1) to a vertically upward direction through the microfiche and into housing 18 through an appropriate opening. Additional mirrors (not shown) are provided within the housing for redirecting the beam towards screen 22. In this regard, in a preferred embodiment, the beam is redirected within housing 18 in accordance with co-pending United States application Ser. No. 127,240, filed Mar. 4, 1980, and entitled, MICROFICHE READER ASSEMBLY AND METHOD assigned to the assignee of the present application. All of the mirrors may be conventional in design and, in this regard, mirror 33 is preferably one which will redirect visible light but which will allow infrared to pass therethrough and out of the optical train, as indicated by arrows 26A.

Optical arrangement 13 also includes a condenser lens 34 located on the beam path optically between light source 28 and the supported microfiche 17. As illustrated in FIG. 2, the condenser lens is physically located along the vertical segment of the overall path between the microfiche and mirror 33. With the condenser lens in this position, its focal point indicated at F is also located on the beam path optically between the supported microfiche and screen 22. As also seen in FIG. 2, this focal point is physically located along the same vertical path segment as the condenser lens but on the opposite side of microfiche 17. The condenser lens may be of any suitable type which is compatible with the overall optical arrangement to provide a satisfactory microfiche image on screen 22. In an actual working embodiment, it is constructed of glass, it has an F number of 1.7 and its focal length is 50 mm.

In addition to the various components thus far described, optical arrangement 13 includes a projection lens assembly 36 which, like the condenser lens, may be of any suitable type compatible with the overall optical arrangement for providing a satisfactory microfiche image on screen 22. In an actual working embodiment, the projection lens assembly is comprised of a Cooke triplet located within an appropriate housing. All of these components are fixedly located in position by suitable mounting means (not shown). In accordance with one aspect of the present invention, this overall assembly is optically located on the beam path between the supported microfiche and focal point F of condenser lens 34 such that the focal point is spaced a predetermined distance from the projection lens. As stated previously, it has been found that by positioning the focal point of condenser 34 beyond the projection lens assembly, that is, past the assembly optically as opposed to at or in front of the objective lens, the illumination efficiency is improved.

In a preferred embodiment, the position selected for focal point F of condenser lens 34 is one which maximizes the illumination efficiency of light source 28 on screen 22 using the various components of arrangement 13 just described. This is best exemplified in the diagrammatic illustration of percent illumination efficiency (% eff) as a function of distance L(F) which, as is seen in FIG. 2, is the spacing between the focal point and the center of projection lens assembly 36. In FIG. 3, the vertical axis represents % eff and the horizontal axis represents L(F) where L(F) is equal to zero at the vertical axis which, in turn, represents the center of the projection lens assembly. Note that % eff. increases to a maximum when the focal point is located a predetermined distance from the projection lens assembly and then decreases again. It is at the peak of this curve that the focal point F is located in a preferred embodiment of arrangement 13. In an actual embodiment, this distance is 15 mm while the distances L1 and L2 are 9 mm and 26 mm, respectively, where L1 is the distance between the condenser lens and microfiche 17 and L2 is the distance between the latter and the center point of projection lens assembly 36.

Having described the overall microfiche reader 10 and optical arrangement 13 in particular, attention is now directed to Table 1 below which illustrates an efficiency comparison of three microfiche readers designated as readers 1, 2 and 3. Reader number 3 was designed in accordance with the present invention including the various components of arrangement 13 described above. Readers No. 1 and 2 were those prior art readers discussed previously, specifically those including a 130 watt lamp and a 48 watt lamp, respectively.

TABLE I

EFFICIENCY COMPARISON OF THREE MICROFICHE READERS
Lumens of light remaining after traversing reader through indicated item (Percent efficiency of item in brackets)

| Reader # | Lamp Power (Watt) | Lamp Output | Condenser | I.R. Filter | All Apertures | Clam Shells & Condenser |
|---|---|---|---|---|---|---|
| 1 | 130 | 3560 | 53 (1.5) | 50 (93) | 17 (35) | 13 (74) |
| 2 | 48 | 1105 | 78 (7.1) | 72 (93) | 28 (39) | 21 (74) |
| 3 | 12 | 250 | 55 (22) | 51 (93) | 20 (39) | 15 (74) |

| Reader # | Projector Lens | Mirrors | Screen | Gross Efficiency (%) | Time to Discharge 9 "D" cells (hrs) | Approximate Screen Brightness (ft. L) |
|---|---|---|---|---|---|---|
| 1 | 9 (70) | 7.8 (87) | 5.1 (65) | 0.14 | .5 | 40 |
| 2 | 14 (65) | 11 (87) | 7.7 (65) | 0.7 | 1.25 | 50 |
| 3 | 10 (70) | 9.2 (78) | 5.3 (65) | 2.1 | 5.0 | 50 |

From this table it can be seen that the brightness of the screen of reader No. 3 is approximately the same as the brightness of readers No. 1 and 2. In all three cases, the brightness of the screen is satisfactory. However, it should be noted that in order to get these outputs, reader No. 1 uses a 130 watt lamp having a 3560 lumen output and reader No. 2 uses a 48 watt lamp having an 1105 lumen output, as discussed previously. This results in a gross efficiency of 0.14% for reader No. 1 and 0.7% for reader No. 2. Both of these percentages are substantially less than the percent efficiency of reader No. 3 which starts with a 12 watt lamp having a 250 lumens output. The efficiency of this latter reader as indicated in Table No. 1. is 2.1%. There is greater significance to this difference than the mere difference in efficiency or power utilization. As stated previously, by providing the low power lamp (with satisfactory brightness at the screen), an internal transformer is unnecessary, the battery life of the reader is improved and an internal fan is eliminated. This latter feature is best exemplified in FIG. 4 which shows the temperature change or rise in degrees F at the microfiche (film plane) as a function of time after the reader has been turned on. Note that the maximum temperature change (after approximately one hour) is about 28° which is significantly lower than the change allowed by ANSI.

Turning now to FIGS. 5–7, attention is directed to a correction lens 40 which may be utilized as a component of previously described arrangement 13. In order to more fully appreciate the function of this lens, attention is specifically directed to FIG. 7 which shows the back side of projection screen 22. The circular area surrounding the screen, indicated at 42, represents the outer periphery of previously described light beam 26 at the screen. This is assuming that the cross section of the beam is circular and that the beam, if not corrected, would be sufficiently large at the screen to just encircle the latter, as illustrated. Under these conditions, it should be apparent that the light that does not impinge on screen 22 is wasted and that this may be a significant amount. In fact, mathematically, the ratio between the two (in area) is 0.785. However, as will be seen below, lens 40 is utilized to insure that substantially all of the light from beam 26 is directed into and within the confines of the back side of the screen.

As seen in FIGS. 5 and 6, lens 40 has a circular outermost periphery 43 and a centrally located rectangular through hole 44. Returning briefly to FIG. 2, this correction lens if used is preferably positioned optically between light source 28 and condenser 34 and physically between the light source and mirror 33, as indicated by dotted lines. The rectangular through hole is designed for passing freely the central section of the beam sufficient to illuminate just the confines of the back side of the screen and only the confines. The lens itself which surrounds the periphery of the through hole acts as a refracting means for redirecting onto the screen substantially all of the light from the beam which would otherwise not fall within the confines of the screen, specifically, the outer peripheral light indicated at 42. This is best illustrated in FIG. 6 by arrow 46 which indicates the free passage of the center rectangle of light and the arrows 48 which indicate the outer periphery of the light which is refracted inwardly slightly to fall within the confines of the screen 22. This refracted light will fall primarily around the periphery of the screen and will most likely not further illuminate the center thereof. However, in most cases, the center will not require further illumination.

In a preferred embodiment where it is desirable to have high magnification of a given microfiche section, optical arrangement 13 can be provided with an additional long focal length lens 50 to provide slight additional convergence of beam 26 so as to illuminate a smaller area of the microfiche 17. As an example, lens 50 could have an F number of 7 and a focal length of 230 mm, e.g. the focal point is well beyong the focal point F of main condenser lens 34. Where high magnification is not desired, in this embodiment, the additional lens 50 would be removed from the optical train. On the other hand, it is possible to design light reflector 32 to include functionally (e.g optically) the necessary converging of beam 26 associated with lens 50, thereby eliminating the need for a lens 50. In this case, where it is desirable to have low magnification, a long focal length divering negative lens could be located at the position of lens 50 in order to remove the added convergence of beam 26 resulting from the specially designed reflector 32. This is best illustrated diagrammatically in FIG. 8 where a light reflector 32' operates in cooperation with a light source 20' to provide the necessary converging beam 26' to provide the required magnification. In order to de-magnify the beam, the negative lens generally indicated by dotted lines at 50' is placed in the beam path just in front of the light source.

In addition, it is to be pointed out that arrangement 13 as described is quite well suited for use in the desk drawer reader assembly described in co-pending United States patent application Ser. No. 127,239, filed Mar. 4, 1980 and entitled A COLLAPSIBLE MICROFICHE READER ASSEMBLY ESPECIALLY SUITABLE FOR USE IN A DESK DRAWER assigned to assignee of the present application.

What is claimed is:

1. In a microfiche reader including means for supporting a microfiche in a given area of a predetermined plane and a rectangular projection screen, an optical arrangement for providing an image onto said screen for viewing thereon, said arrangement comprising:
   (a) means including a light source for directing a beam of light along a predetermined path through said given area and towards said screen;
   (b) a condenser lens located on said beam path between said given area and said light source and including a focal point located on said path between said given area and said screen;
   (c) a projection lens assembly located on said path between said given area and the focal point of said condenser lens, said focal point being spaced a predetermined distance from said projection lens; and
   (d) means located on said beam path between said light source and said condenser lens for insuring that substantially all of said light from said beam is directed onto the backside of said screen, said last-named means including a correction lens located on said path between said light source and said condenser lens, said correction lens including a rectangular through hole for passing freely a section of said beam sufficient to illuminate just the confines of the backside of said screen and only said confines, and light refracting means around the periphery of said through hole for redirecting onto said screen substantially all of the light from said beam which would otherwise not fall within the confines of said screen.

2. An arrangement according to claim 1 wherein said predetermined distance is selected to maximize the illumination efficiency of said light source on said screen.

3. An arrangement according to claim 1 wherein the amount of light projected onto said screen is at least about 2% of the light from said source.

4. An arrangement according to claim 1 including a high magnification lens located between said condenser lens and said light source for illuminating a smaller area of said microfiche.

5. In a microfiche reader assembly including means for supporting a microfiche in a given area of a predetermined plane and a rectangular projection screen, an optical arrangement for providing an image onto said screen for viewing thereon, said arrangement comprising:
   (a) means including a light source for directing a beam of light along a predetermined path through said given area and towards said screen;
   (b) a condenser lens located on said beam path between said given area and said light source;
   (c) a projection lens assembly located on said path between said given area and said screen and cooperating with said condenser lens for directing a portion of the light from said beam onto a fixed surface area of said screen, said condenser and projection lenses being incapable by themselves to direct all of the light from said beam onto said fixed area; and
   (d) means separate from said condenser lens and projecting lens assembly located on said beam path for insuring that substantially all of said light from said beam is directed onto the backside of said screen within the confines of said fixed surface area.

6. An arrangement according to claim 5 wherein said last-named means includes a correction lens located on said path between said light source and said condenser lens, said correction lens including a rectangular through hole for passing freely a section of said beam sufficient to illuminate just the confines of the backside of said screen within said area and only said area, and light refracting means around the periphery of said through hole for redirecting onto said screen and into said area substantially all of the light from said beam which would otherwise not fall within the confines of said area.

7. In a microfiche reader assembly including means for supporting a microfiche in a given area of a predetermined plane and a rectangular projection screen having a backside and a front side, a method of providing an image onto the back side of said screen for viewing from its front side, said method comprising:
   (a) directing a beam of light from a light source along a predetermined path through a microfiche supported across said given area and towards the back side of said screen;
   (b) at the location on said beam path between said light source and said microfiche and utilizing a condenser lens, focusing said beam to the focal point located between said microfiche and said screen;

(c) at the location between said microfiche and said screen and utilizing a projection lens, projecting said beam onto the back side of said screen; and (d) insuring that substantially all of said light from said beam is directed onto and within the confines of a fixed area on the back side of said screen by passing freely a predetermined central cross section of said beam corresponding in shape to said fixed area, said cross section being selected to illuminate just the confines of said area on the back side of the screen and only said area, and refracting the outer peripheral cross section of said beam for redirecting into said area on said screen substantially all of the light from said beam which would otherwise not fall within the confines of said area.

8. An arrangement according to claim 5 wherein said last-named means includes a correction lens located on said path between said light source and said condenser lens, said correction lens including a central section of predetermined configuration for passing freely a portion of said beam sufficient to illuminate just the confines of the back side of said screen within said fixed area and only said area, and light refracting means around the periphery of said central section for redirecting onto said screen and into said fixed area substantially all of the light from said beam which would otherwise not fall within the confines of said area.

* * * * *